United States Patent [19]
Herbert et al.

[11] 3,897,471
[45] July 29, 1975

[54] PROCESS FOR PRODUCING METHANOL

[75] Inventors: Rolf Herbert, Cologne-Marienburg; Helmut Liebgott, Bad Homburg, both of Germany

[73] Assignee: Metallgesellschaft Aktiengesellschaft, Frankfurt am Main, Germany

[22] Filed: Oct. 13, 1972

[21] Appl. No.: 297,521

Related U.S. Application Data

[63] Continuation of Ser. No. 44,538, June 8, 1970, abandoned.

[30] Foreign Application Priority Data

June 18, 1969 Germany.............................. 1930702

[52] U.S. Cl. ............. 260/449.5; 252/471; 252/475; 252/373
[51] Int. Cl.............................................. C07c 31/06
[58] Field of Search ......... 260/449.5; 252/373, 471, 252/475

[56] References Cited
UNITED STATES PATENTS

| | | | |
|---|---|---|---|
| 1,875,714 | 9/1932 | Edmonds.......................... | 260/449.5 |
| 2,061,470 | 11/1936 | Larson............................. | 260/449.5 |
| 3,326,956 | 6/1967 | Davies et al. .................... | 260/449.5 |
| 3,441,395 | 4/1969 | Dent .............................. | 252/373 UX |

FOREIGN PATENTS OR APPLICATIONS 820,257  9/1959  United Kingdom................ 252/373

*Primary Examiner*—Howard T. Mars
*Attorney, Agent, or Firm*—Burgess, Dinklage & Sprung

[57] ABSTRACT

In the production of methanol by contacting a synthesis gas containing oxides of carbon and hydrogen with a catalyst at elevated temperature and pressure, the improvment which comprises employing a catalyst comprising copper and vanadium and one or both of zinc and manganese at a temperature of about 200°–300°C, and a pressure of about 20–100 kilograms per square centimeter above atmospheric pressure.

6 Claims, No Drawings

PROCESS FOR PRODUCING METHANOL

This is a continuation of application Ser. No. 44,538 field June 8, 1970, and now abandoned.

It is known to produce methanol by a catalytic reaction of the oxides of carbon with hydrogen at elevated temperature and elevated pressure. The catalyst usually consists of zinc chromite which, at temperatures above 300°C., has an activity which is high enough to cause the reactions between the carbon oxides and hydrogen to proceed at a sufficiently high rate. At these temperatures, however, the thermodynamic equilibrium is established under conditions which are so unfavorable that methanol cannot be formed in appreciable amounts unless pressures in excess of 200 kilograms per square centimeter are employed.

Catalysts which contain copper in addition to zinc and chromium can catalyze the methanol-forming reaction at temperatures of 200°–300°C. so that the synthesis may be carried out at relatively lower pressures, e.g. 50–100 kilograms per square centimeter above atmospheric pressure. These catalysts have the disadvantage, however, that they may be used only within a narrow temperature range, they may be operated only to give a moderate space-time yield, and they do not have long lives of 10,000 hours and more, such as the earlier zinc chromite contact catalysts.

These deficiencies especially prevail if the conditions of temperature, pressure, gas composition and space velocity are selected so that more than about 1 kilogram of methanol is formed per liter of catalyst per hour. The formation of 1 kilogram of methanol liberates 800 kilocalories of reaction heat. As a result of this highly exothermic reaction, high local peak temperatures may arise in the catalyst and, by crystal growth of the copper, may result in accelerated ageing of the copper catalyst.

It has now been found that methanol may be synthesized at pressures of 10-100 kilograms above atmospheric pressure and at temperatures of 200°–300°C. even under the severe conditions required for a high space-time yield, which involves a generation of large amounts of heat, if catalysts are used which, in addition to copper, contain vanadium and one or both of the elements zinc and manganese. The contents of the several elements, expressed in atomic percentages of the pure metals, should be approximately within the following limits:

| | |
|---|---|
| copper | 30–80 atomic per cent |
| zinc | <50 atomic per cent |
| manganese | <50 atomic per cent |
| vanadium | 1–25 atomic per cent. |

It is preferable to use catalysts which contain about 40–60 atomic per cent copper, about 5–15 atomic per cent vanadium, with the balance comprising zinc and/or manganese. When zinc or manganese is present preferably each is present to the extent of at least about 10 atomic per cent, and if both are present the total content is preferably up to about 50 atomic per cent.

A preferred composition on an atomic percentage comprises about 40–60% of copper, about 10–20% of vanadium, and about 20–50% of one or both of zinc and manganese.

In the vanadium-containing catalysts according to the invention, the copper content is not so susceptible to crystal changes as a result of local overheating as in the known catalysts which contain copper and chromium. For this reason, the catalysts according to the invention may be operated to give a higher space-time yield or, for a give yield, will permit smaller, less costly equipment which is of obvious advantage.

The catalysts according to the invention are obtained in the form of hydroxides and/or carbonates by precipitation of the corresponding metals from solutions of salts thereof. It is desirable to provide solutions of nitrates of the metals and to precipitate the metals with sodium carbonate. The resulting precipitates are washed free of alkali, then dried, heat-treated (calcined) to convert the precipitated carbonates into the oxides, and compacted to form tablets.

Vanadium may be added to the sodium carbonate solution in the form of sodium vanadate and to the resulting solution there may be added the solution of the mixed nitrates of copper and zinc and/or manganese. Alternatively, the nitrates of copper and zinc and/or manganese may be charged as an aqueous solution into the aqueous solution of sodium carbonate and the vanadium content in the form of vanadium pentoxide may be kneaded into the precipitate when the latter has been washed free of alkali.

The gas used in the synthesis is preferably free of sulfur and contains carbon monoxide, carbon dioxide and hydrogen in such molar quantities that the following stoichiometric relation applies:

$$\frac{H_2 - CO_2}{CO + CO_2} \geq 2.0$$

Suitable synthesis gases may be produced, for example, by catalytic cracking of gaseous or liquid hydrocarbons with steam. Where liquid hydrocarbons are used, it has proven particularly desirable not to react them with steam directly in an externally heated tubular heater, but first to subject them in known manner to an autothermic reaction with the steam at temperatures of 400°–500°C. in the presence of a nickel-containing catalyst to form a gas high in methane content, which is then reacted with the remaining, unreacted steam in an externally heated tubular heater at temperatures of 700°–850°C. to form a gas which is suitable for the synthesis of methanol. This mode of operation has the economic advantage that less steam must be added to the feed hydrocarbon per unit weight thereof. This smaller addition of steam results in a change in the composition of the cracked gas leaving the tubular heater in that the content of $CO_2$ decreases and the content of CO increases. The reaction of CO and $H_2$ to form methanol is much faster than the reaction of $CO_2$ and $H_2$ so that a high ratio of CO to $CO_2$ is desired for the synthesis.

The known reaction of 3.3 kilograms steam and 1 kilogram of a substantially aliphatic gasoline or petrol, boiling in the range of 40°–110°C., over a catalyst which contains nickel on an aluminum support and which has been rendered alkaline by addition of potassium carbonate, which reaction is carried out in an externally heated tubular heater having an outlet temperature maintained at 800°C. and operated under a reaction pressure of 6 kilograms per square centimeter, results in a gas having the following composition by volume:

| | |
|---|---|
| $CO_2$ | 10.8% |

-Continued

| | |
|---|---|
| CO | 17.8% |
| $H_2$ | 69.5% |
| $CH_4$ | 1.9% |

If the same gasoline or petrol is first reacted at a lower temperature of about 450°C. with steam on a catalyst consisting of nickel on a magnesium silicate support, the amount of steam which is to be added is reduced to 2.5 kilograms per kilogram of gasoline or petrol. The resulting cracked gas has approximately the following composition by volume, on a dry basis:

| | |
|---|---|
| $CO_2$ | 22.4% |
| CO | 0.5% |
| $H_2$ | 19.8% |
| $CH_4$ | 57.3% |

The mixture of unreacted steam and cracked gas which leaves this first stage is fed directly into the tubular heater described above and its treatment at the same temperature and under the same pressure results in a cracked gas having the following composition by volume:

| | |
|---|---|
| $CO_2$ | 8.7% |
| CO | 20.5% |
| $H_2$ | 67.2% |
| $CH_4$ | 2.6% |

This two-stage process has the additional advantage that the cracked gas which leaves the tubular heater is reliably free of olefins. In contrast, the cracked gases produced by direct cracking of gasoline or petrol in a tubular heater may contain traces of olefins, which result in deposits on the copper-containing catalysts and adversely affect the activity of the catalysts.

Another important advantage of the cracking of liquid hydrocarbons in two stages to produce a synthesis gas resides in the fact that catalysts which are free of alkali may be used in the tubular heater in the second stage. The catalysts which are conventionally used in the cracking of higher hydrocarbons with steam in commercial plants always contain alkali, e.g. in the form of potassium carbonate. Experience indicates some alkaline compounds are unintentionally removed from the cracking catalysts by the cracked gas and may reach the methanol synthesis catalyst, where they result in its deterioration.

The catalysts according to the invention permit the synthesis of methanol at temperatures of about 200°–300°C. Owing to the desirable thermodynamic equilibrium conditions it is not necessary to use very high pressures. It has proven desirable to use pressures of about 20–100 kilograms per square centimeter, preferably about 40–60 kilograms per square centimeter, above atmospheric pressure. The catalysts are desirably provided in tubes through which the synthesis gas flows. The linear velocity of the gas through the tubes should exceed about 2 meters and desirably about 5 meters per second, computed on the basis of the tubes being empty and the gases being at 760 millimeters Hg and 0°C.

For the dissipation of the heat generated by the reaction, the catalyst-filled tubes are surrounded by a jacket, which contains a liquid, such as water under elevated pressure, so that the heat is dissipated by boiling of the liquid at constant temperature. The optimum reaction temperature is between about 200°C. and 260°C.

The invention is further described in the following illustrative examples:

EXAMPLE 1

Production of a catalyst which contains 60 atomic per cent Cu, 30 atomic per cent Zn, and 10 atomic per cent V: 1,450 grams of $Cu(NO_3)_2 \cdot 3H_2O$ and 892.5 grams of $Zn(NO_3)_2 \cdot 6H_2O$ are dissolved in 18 liters of water. 140 grams of $NaVO_3 \cdot H_2O$ and 901 grams of $Na_2CO_3$ are also dissolved in 18 liters of water. Both solutions are heated to 80°–90°C. The nitrate solution is then run into the sodium carbonatevanadate solution with intense stirring. The resulting precipitate is removed by suction filtration, washed with a total of 100 liters of warm water, dried at 110°C., then calcined for 5 hours at 300°C. and together with 2% graphite is compacted to form 4 × 4-millimeter tablets.

EXAMPLE 2

Production of a catalyst which contains 50 atomic per cent Cu, 30 atomic per cent Mn and 20 atomic per cent V: 1,208 grams of $Cu(NO_3)_2 \cdot 3H_2O$ and 861 grams of $Mn(NO_3)_2 \cdot 6H_2O$ are dissolved in 16 liters of water. The solution is heated to 80°–90°C. and with intense stirring is run into a solution, also heated to 80°–90°C., of 848 grams of $Na_2CO_3$ in 16 liters of water. The precipitate is removed by suction filtration, washed with a total of 90 liters of warm water, and the still moist cake is kneaded together with 182 grams of $V_2O_5$. The resulting mix is dried at 110°C. and calcined for 3 hours at 400°C.

EXAMPLE 3

Synthesis of methanol with a catalyst according to the invention: 2.9 liters of a catalyst produced according to Example 1 are filled into a tube having an inside diameter of 32 millimeters and a height of 5 meters. The tube is surrounded by a pressure jacket, which contains boiling water under an adjustable pressure of 28 kilograms per square centimeter above atmospheric pressure and at 230°C. A gas comprising, by volume:

| | |
|---|---|
| $CO_2$ | 5% |
| CO | 10% |
| $H_2$ | 73% |
| $CH_4$ | 12% | is passed through the catalyst from top to bottom at a pressure of 45 kilograms per square centimeter above atmospheric pressure. At the beginning of the test, 3.1 kilograms of methanol are recovered per hour by condensation from the outflowing gas. After the first 250 hours of operation, the methanol rate has dropped to 2.9 kilograms per hour. The test is continued for a total of 3,500 hours under constant conditions. Throughout that time, the rate of methanol recovery varies between 2.8 and 2.9 kilograms per hour and during the last 300 hours of the test averages 2.83 kilograms per hour.

EXAMPLE 4

2.9 liters of a catalyst, made in accordance with Example 2 but containing 60 atomic per cent Cu, 10 atomic per cent Mn, 20 atomic per cent Zn and 10 atomic per cent V, are filled into the apparatus used in Example 3. Contrary to Example 3, the gas is not passed through the tube only once, but when the resulting methanol has been removed by condensation, part of the gas is recycled. The following rates and concentrations are obtained:

|  | Fresh gas | Recycled gas |
| --- | --- | --- |
| Rate in standard liters per hour | 8000 | 2200 |
| Content in % |  |  |
| $CO_2$ | 9.7 | 12.0 |
| CO | 16.3 | 2.9 |
| $H_2$ | 70.8 | 73.8 |
| $CH_4$ | 3.2 | 11.3 |

The pressure in the reaction tube is maintained at 50 kilograms per square centimeter above atmospheric pressure. The temperature in the water-filled outer shell is 230°C., just as in Example 3. 2.9 kilograms of crude methanol, which contains 14% water by weight, are removed per hour by condensation from the gas leaving the reactor.

The test was continued for 2,800 hours. As a result of external influences, such as a fluctuating capacity of the gas-recycling pump, the rate at which crude methanol was produced varied between 2.8 and 3.0 kilograms per hour with no observable general decrease in the production rate during the course of the test.

It will be appreciated that the instant specification and examples are set forth by way of illustration and not limitation, and that various modifications and changes may be made without departing from the spirit and scope of the present invention.

What is claimed is:

1. In the production of methanol by contacting a synthesis gas containing oxides of carbon and hydrogen with a catalyst at elevated temperature and pressure, the improvement which comprises employing a catalyst consisting essentially of copper and vanadium and one or both of zinc and manganese at a temperature of about 200°–300°C. and a pressure of about 20–100 kilograms per square centimeter above atmospheric pressure, the catalyst on an atomic percentage based on pure metals containing about 40–60% of copper, about 10–20% of vanadium, and about 20–50% of one or both of zinc and manganese, said catalyst having been prepared by precipitation of salts of the metals from a solution thereof followed by calcination.

2. Process according to claim 1 wherein the molar proportions of carbon monoxide, carbon dioxide and hydrogen are such that

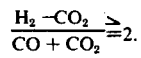

$$\frac{H_2 - CO_2}{CO + CO_2} \geq 2.$$

3. Process according to claim 1 wherein the catalyst is present in a tube through which the synthesis gas is passed at a linear velocity of at least 2 meters per second computed on the basis of the tube being empty and the gases being at 760 mm Hg and 0°C.

4. Process according to claim 1 wherein the synthesis gas is at a temperature of about 220°–260°C. and a pressure of about 40–60 kilograms per square centimeter above atmospheric pressure.

5. Process according to claim 4 wherein on an atomic percentage based on pure metals the catalyst contains 60% of copper, 10% of vanadium and 30% of zinc.

6. Process according to claim 4 wherein on an atomic percentage based on pure metals the catalyst contains 50% of copper, 20% of vanadium and 30% of manganese.

* * * * *